United States Patent
Eiting et al.

(10) Patent No.: US 10,558,959 B2
(45) Date of Patent: Feb. 11, 2020

(54) MONEY TRANSFERS BY RESIDENTS OF A CONTROLLED FACILITY

(71) Applicant: Moneygram International, Inc., Minneapolis, MN (US)

(72) Inventors: Brinkley Brown Eiting, Dallas, TX (US); Katie Hutcheson, Durango, CO (US)

(73) Assignee: Moneygram International, Inc., Minneapolis, MN (US)

( * ) Notice: Subject to any disclaimer, the term of this patent is extended or adjusted under 35 U.S.C. 154(b) by 652 days.

(21) Appl. No.: 14/512,830

(22) Filed: Oct. 13, 2014

(65) Prior Publication Data

US 2016/0104134 A1    Apr. 14, 2016

(51) Int. Cl.
*G06Q 40/00*  (2012.01)
*G06Q 20/10*  (2012.01)
*G06Q 20/40*  (2012.01)

(52) U.S. Cl.
CPC .............. *G06Q 20/10* (2013.01); *G06Q 20/40* (2013.01)

(58) Field of Classification Search
CPC ............................... G06Q 20/10; G06Q 20/40
See application file for complete search history.

(56) References Cited

U.S. PATENT DOCUMENTS

| | | | | |
|---|---|---|---|---|
| 7,106,843 B1 * | 9/2006 | Gainsboro | ......... | H04M 3/2281 379/191 |
| 7,664,689 B1 * | 2/2010 | Rosenfield | ......... | G06Q 20/10 705/35 |
| 8,014,756 B1 * | 9/2011 | Henderson | ......... | G06Q 10/103 455/411 |
| 8,065,213 B2 * | 11/2011 | Rosenfield | ......... | G06Q 20/10 705/35 |
| 8,498,937 B1 * | 7/2013 | Shipman, Jr. | ......... | G06Q 40/02 705/35 |
| 9,558,332 B1 * | 1/2017 | Keiser | ......... | G06F 21/31 |
| 9,578,162 B2 * | 2/2017 | Bengston | ......... | H04M 3/2281 |

(Continued)

OTHER PUBLICATIONS

Flood et al: "Authors unite in protest over ban on sending books to prisoners: Figures including Pullman and Beard condemn rules: MOJ says move is", The Guardian; London (UK) (Year: 2014).*

*Primary Examiner* — Edward J Baird
(74) *Attorney, Agent, or Firm* — Norton Rose Fulbright US LLP

(57) ABSTRACT

In an aspect, a method includes receiving authorization information from a controlled facility, and receiving a request to initiate a financial transaction at an agent device. At least one party to the financial transaction may be a resident of the controlled facility. The method includes determining whether the resident is authorized to participate in the financial transaction based on the authorization information. Determining whether the resident is authorized to participate in the financial transaction may include determining, based on the authorization information, whether a party that is to receive funds from or provide funds to the resident in connection with the financial transaction corresponds to an entity that the resident of the controlled facility is authorized to receive funds from or provide funds to. The method includes initiating the financial transaction in response to a determination that the resident is authorized to participate in the financial transaction.

21 Claims, 5 Drawing Sheets

(56) References Cited

U.S. PATENT DOCUMENTS

| | | | | |
|---|---|---|---|---|
| 2002/0077977 | A1* | 6/2002 | Neely | G06Q 20/102 |
| | | | | 705/40 |
| 2002/0107792 | A1* | 8/2002 | Anderson | G06Q 10/10 |
| | | | | 705/40 |
| 2004/0230527 | A1* | 11/2004 | Hansen | G06Q 20/02 |
| | | | | 705/40 |
| 2006/0143123 | A1* | 6/2006 | Rallo | G06Q 20/10 |
| | | | | 705/40 |
| 2008/0270246 | A1* | 10/2008 | Chen | G06Q 20/105 |
| | | | | 705/17 |
| 2012/0209769 | A1* | 8/2012 | Rolfs | G06Q 20/10 |
| | | | | 705/44 |
| 2012/0296807 | A1* | 11/2012 | Polozola | G06Q 30/02 |
| | | | | 705/38 |
| 2014/0195427 | A1* | 7/2014 | Reeve | G06Q 20/32 |
| | | | | 705/42 |

* cited by examiner

MONEY TRANSFERS BY RESIDENTS OF A CONTROLLED FACILITY

TECHNICAL FIELD

The present disclosure relates to money transfer services, and in particular, providing money transfer services to/from residents of a controlled facility.

BACKGROUND

Controlled facilities can take various forms including prisons or correctional facilities, half-way houses, nursing homes, assisted living centers, and/or other controlled facilities/entities. Each of these exemplary controlled facilities serves a different societal need and may provide services unique to those needs. Each of these controlled facilities may also provide services that are common to the needs of all residents of controlled facilities. For example, in a controlled facility environment, the controlled facility exerts at least some control over financial transactions initiated by the residents of the controlled facility (e.g., for monitoring and regulatory compliance purposes). Providing financial transaction services to residents may create a substantial administrative burden on the controlled facility, increasing the costs to operate the controlled facility, and, in some cases, reducing or limiting the residents' access to such services.

BRIEF SUMMARY

The present disclosure is directed to systems, methods, and computer-readable storage media for providing financial transaction services to residents of a controlled facility while reducing an administrative burden imposed on the operator of the controlled facility in connection with providing the financial transaction services. The financial transaction services may include money transfers, bill pay services, e-commerce services, purchases of goods, and other services that require an exchange of monetary funds. The systems, methods, and computer-readable storage media may provide for authentication of a resident of the controlled facility in connection with initiation of a financial transaction, validation of information associated with an account of the resident in connection with the initiation of the financial transaction, authorization of the financial transaction based on rules imposed by or on the controlled facility or a money transfer entity with respect to the financial transaction, and may provide reporting capabilities that may be used to ensure compliance with the rules and for auditing purposes. Additional features and benefits of the systems, methods, and computer-readable storage media of the present disclosure are described in detail below.

In an aspect, a method is disclosed and includes receiving a request to initiate a financial transaction at an electronic device associated with a controlled facility. The request may identify a transferor and a transferee, where at least one of the transferor and the transferee corresponds to a resident of the controlled facility, and the transferee is to receive funds in connection with the money transfer. The method includes determining whether the transferee is an authorized transferee based on authorization information stored in a database accessible to the electronic device. In response to a determination that the transferee is an authorized transferee, the method includes initiating the money transfer.

In another aspect, a method includes receiving a request to initiate a money transfer at an agent device from an electronic device associated with a controlled facility. The request may identify a transferor and a transferee, where at least one of the transferor and the transferee corresponds to a resident of the controlled facility, and the transferee is to receive funds in connection with the money transfer. The method includes determining whether the transferee is an authorized transferee based on authorization information stored in a database accessible to the agent device. In response to a determination that the transferee is an authorized transferee, the method may include initiating the money transfer.

In an additional aspect, an apparatus includes a processor, and a memory. The memory may store instructions that, when executed by the processor, cause the processor to perform operations that include receiving a request to initiate a money transfer at an agent device from an electronic device associated with a controlled facility. The request may identify a transferor and a transferee, where at least one of the transferor and the transferee corresponds to a resident of the controlled facility, and the transferee is to receive funds in connection with the money transfer. The operations may include determining whether the transferee is an authorized transferee based on authorization information stored in a database accessible to the agent device, and, in response to a determination that the transferee is an authorized transferee, initiating the money transfer.

In yet another aspect, a computer-readable storage medium stores instructions that, when executed by a processor, cause the processor to perform operations that include receiving a request to initiate a money transfer at an agent device from an electronic device associated with a controlled facility. The request may identify a transferor and a transferee, where at least one of the transferor and the transferee corresponds to a resident of the controlled facility, and the transferee is to receive funds in connection with the money transfer. The operations may include determining whether the transferee is an authorized transferee based on authorization information stored in a database accessible to the agent device, and, in response to a determination that the transferee is an authorized transferee, initiating the money transfer.

The foregoing has outlined rather broadly the features and technical advantages of the present invention in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes of the present application. It should also be realized by those skilled in the art that such equivalent constructions do not depart from the spirit and scope of the application as set forth in the appended claims. The novel features which are believed to be characteristic of embodiments described herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present embodiments.

BRIEF DESCRIPTION OF THE DRAWINGS

For a more complete understanding of the disclosed methods and apparatuses, reference should be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Figure 1:
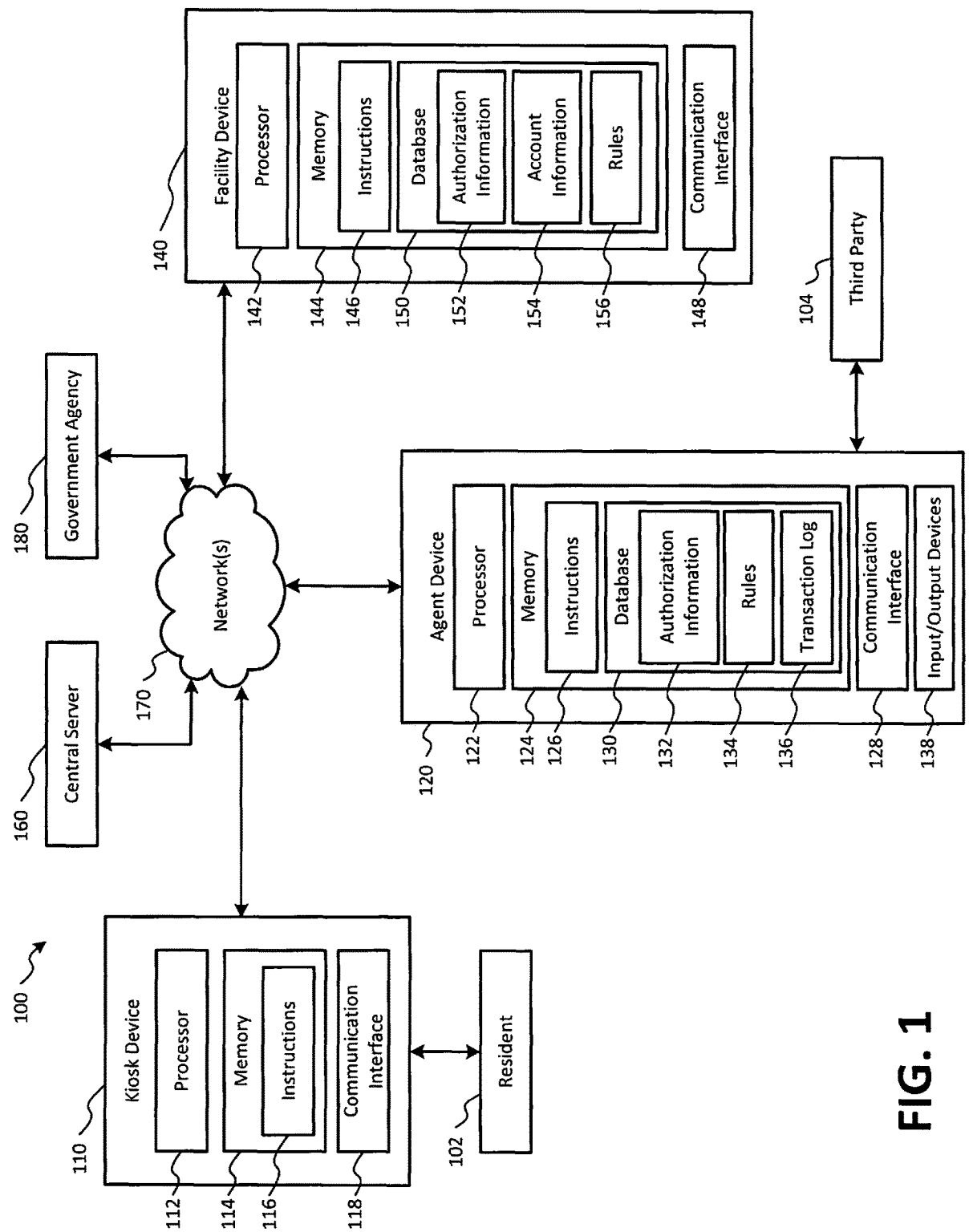
FIG. 1 illustrates a block diagram of a system for providing financial transaction services to residents of a controlled facility.

Referring to FIG. 1, a block diagram of a system for providing financial transaction services to residents of a controlled facility is shown as a system 100. As shown in FIG. 1, the system 100 includes a kiosk device 110, an agent device 120, an electronic device 140, a central server 160, a network 170, and a government agency 180. The controlled facility may be a prison facility, a correctional facility, a nursing home facility, a half-way house facility, an assisted living facility, or another facility where individuals requiring financial services may reside, such as a dormitory at a university. One or more residents of the controlled facility may be provided with an account into which funds may be deposited into and withdrawn from under the control of the controlled facility.

The types of control that a controlled facility may exert on the accounts of its residents may vary for different types of controlled facilities. For example, regulations limiting placed on the number, frequency, and types of financial transactions that a resident of a prison facility may participate in may be different than regulations imposed on accounts of residents for different type of controlled facility. Additionally, the source of the regulations may be different for different types of facilities. For example, in a nursing home facility or an assisted living facility, a family member of the resident may be financially responsible for the resident (e.g., by way of a power of attorney arrangement), but may not be available at all times to provide for the financial needs of the resident, such as for purchasing items the resident needs. In such instances, the family member may authorize the nursing home facility or the assisted living facility to make limited types of purchases for the resident, and/or may limit the amounts and frequency at which the nursing home facility or the assisted living facility may make purchases for the resident.

The various controls may be imposed on different types of controlled facilities for different purposes. For example, in the prison facility setting, the controls may be imposed to reduce a likelihood that the residents of the prison facility will engage in fraud, money laundering, or other illicit types of behavior, whereas, in the nursing home facility setting, the controls may be imposed to protect the financial well-being of residents that may not have the capacity to make financial decisions on their own.

Additionally, the controls may limit financial transactions to a threshold amount per financial transaction (e.g., $250 per financial transaction), or may limit the entities (e.g., other residents, third parties, businesses, etc.) that may engage in financial transactions, or specific types of financial transactions with the residents. For example, a resident may be limited to initiating money transfers to and from immediate family and/or making purchases from an approved list of businesses. Further, controls imposed on financial transactions initiated by residents may be different for different residents of a same controlled facility. For example, in a prison facility, a greater number of controls may be imposed on a resident that has been convicted of a financial crime than a resident that was convicted of a non-financial crime.

Some of the financial transactions initiated by residents of the controlled facility may utilize services provided by service providers that are distinct from, and separate from the controlled facility. The service providers may also have regulations imposed upon them, and the regulations imposed on the service providers may be different from the regulations imposed on the controlled facility. For example, money transfer entities may be required to monitor financial transactions for potential fraud or money laundering activity, such as money transfers to certain countries or entities, or patterns of financial transactions that are indicative of such illicit activities. Coordinating control of the accounts and financial transactions of the residents and complying with the appropriate regulations may require that the controlled facility and any service providers providing services to the residents of the controlled facility share information, and that the systems of the controlled facility and the services providers communicate information associated with financial transactions being processed on behalf of residents in a timely, and in some instances real-time, manner. The system 100 may provide financial transaction services to residents of the controlled facility while reducing an administrative burden imposed on the controlled facility in connection with providing the financial transaction services to the residents, as described in more detail below.

The kiosk device 110, includes a processor 112, a memory 114, and a communication interface 118. The memory 114 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. The memory 114 may store instructions 116 that, when executed by the processor 112, cause the processor 112 to perform operations described in connection with the kiosk device 110 with reference to FIGS. 1-5. In an aspect, the kiosk device 110 may be a personal computer device, a tablet computing device, a mobile communication device, a smartphone device, a laptop computing device, another computing device, or a combination thereof.

In an aspect, the instructions 116 may include instructions that, when executed by the processor 112, cause the processor 112 to present various graphical user interfaces (GUIs) at a display device (not shown in FIG. 1) of the kiosk device 110. The GUIs may be configured to authenticate a resident in connection with a request to initiate a financial transaction. For example, a resident 102 may use a first GUI presented at the display device of the kiosk device 110 to provide a username and password. The kiosk device 110 may authenticate the resident 102's username, and, upon successful authentication of the resident 102, may present one or more additional GUIs to the resident 102. The one or more additional GUIs may enable the resident 102 to view a current balance of an account provided to the resident 102 by the controlled facility, to view a log of financial transactions that the resident 102 has completed, and to request a new financial transaction, as described in more detail below.

The communication interface 118 may be configured to communicatively couple the kiosk device 110 to one or more networks, such as the network 170 via a wired or wireless connection established according to one or more communication protocols or standards (e.g., an Ethernet protocol, a transmission control protocol/internet protocol (TCP/IP), an institute of electrical and electronics engineers (IEEE) 802.11 protocol, and an IEEE 802.16 protocol, a $3^{rd}$ generation (3G) protocol, a $4^{th}$ generation (4G)/long term evolution (LTE) protocol, etc.). The kiosk device 110 may communicate with the agent device 120 and/or the electronic device 140 via the connection to the network 170. In an aspect, the kiosk device 110 and the electronic device 140 may be a single device configured to perform the operations described herein with respect to both the kiosk device 110 and the electronic device 140, as described with reference to FIG. 2. In an additional or alternative aspect, the kiosk device 110 and the agent device 120 may be a single device configured to perform the operations described herein with respect to both the kiosk device 110 and the agent device 120. For example, the kiosk device 110 may be integrated with an agent device and provided to the controlled facility associated with the electronic device 140 by a money transfer entity, as described with reference to FIG. 3.

The network 170 may be a wired network, a wireless network, or may include a combination of wired and wireless networks. For example, the network 170 may be a local area network (LAN), a wide area network (WAN), a wireless WAN, a wireless LAN (WLAN), a metropolitan area network (MAN), a wireless MAN network, a cellular data network, a cellular voice network, the internet, etc. Additionally, the network 170 may include multiple networks operated by different entities. For example, the network 170 may include a first network (e.g., a LAN) operated by the controlled facility, a second network (e.g., a LAN, WAN, WLAN, wireless WAN, etc.) operated by a money transfer entity, and other networks (e.g., the internet) that communicatively couple the first network and the second network.

As shown in FIG. 1, the agent device 120 includes a processor 122, a memory 124, and a communication interface 128. The memory 124 may include ROM devices, RAM devices, one or more HDDs, flash memory devices, SSDs, other devices configured to store data in a persistent or non-persistent state, or a combination of different memory devices. The memory 124 may store instructions 126 that, when executed by the processor 122, cause the processor 122 to perform operations described in connection with the agent device 120 with reference to FIGS. 1-5. The agent device 120 may be operated by a money transfer entity.

The memory 124 may store a database 130 that stores information that is to be used to in conjunction with providing financial services to the residents (e.g., the resident 102) of the controlled facility. The information may include authorization information 132, rules 134, and a transaction log 136. The authorization information 132 may identify entities (e.g., persons, business, financial accounts, other residents of the controlled facility, etc.) that the resident 102 (or other residents) of the controlled facility is authorized to transfer funds to, entities that the resident of the controlled facility is authorized to receive funds from, entities that the resident 102 is authorized to make purchases from (e.g., an online retailer), and/or entities that the resident 102 is authorized to provide funds to (e.g., in connection with paying a bill, etc.).

The rules 134 may include rules that are to be used to determine whether a particular transaction requested by the resident 102 (or another resident) can be initiated. For example, the rules 134 may include a first rule indicating that a particular resident is able to participate in a threshold number of financial transactions during a time period (e.g., a day, a week, a month, etc.). Additionally or alternatively, the rules 134 may include a second rule indicating that the particular resident is able to participate in financial transactions having a total value up to a threshold value during the time period (e.g., $500 per week).

In an aspect, the rules 134 may be applied collectively. For example, for a particular financial transaction requested by the resident 102, the system 100 may determine whether to authorize the initiation of the particular financial transaction by determining whether the resident 102 has participated in the threshold number of financial transactions during the time period, and whether the total value of financial transactions that the resident 102 has participated in during the time period exceeds the threshold value. If the resident 102 has not exceeded the threshold number of financial transactions during the time period, and the total value of the financial transactions that the resident 102 has participated in during the time period does not exceed the threshold value, the financial transaction may be authorized. If the resident 102 has participated in the threshold number of financial transactions during the time period, or the total value of the financial transactions that the resident 102 has participated in during the time period exceeds the threshold value, the financial transaction may be denied.

In an additional or alternative aspect, different residents of the controlled facility may have different rules applied to their respective requests to initiate financial transactions. For example, a first resident may have only the first rule applied to requests to initiate financial transactions, a second resident may have only the second rule applied to requests to initiate financial transactions, and a third resident may have both the first rule and the second rule applied to requests to initiate financial transactions. The particular rules applied to a resident's requests to initiate financial transactions may be selectively configured by an operator of the controlled facility and/or by an operator of the money transfer entity operating the agent device 120. In an aspect, the rules applied to a particular resident may be determined based on governmental regulations (e.g., regulations imposed upon the controlled facility and/or the money transfer entity operating the agent device 120 by the government agency 180).

The rules 134 may include a third rule indicating that a requested financial transaction is to be denied if the financial transaction would cause the account of the resident 102 to have a negative balance. Information associated with a current balance of the resident 102 may be received at, or retrieved by the agent device 120 from the electronic device 140 in conjunction with receiving requests to initiate financial transactions. It is noted that the rules described above are by way of illustration, rather than by way of limitation, and the rules 134 may include other rules not described herein for simplicity of description.

The transaction log 136 may be associated with the resident 102 of the controlled facility and may identify financial transactions that the resident 102 of the controlled facility has participated in. In an aspect, the transaction log 136 may be associated with a plurality of residents and may identify financial transactions that each of the residents of the controlled facility has participated in. The financial transactions identified in the transaction log 136 may include purchases, telephone call logs, bills paid, money transfers to and from an account of each of the residents of the controlled facility, pending financial transactions, other types of financial transactions involving an exchange of funds in connection with the account of each of the residents of the controlled facility, or a combination thereof.

The transaction log 136 may indicate a value for each of the financial transactions identified in the transaction log 136, an identity of a party providing funds in connection with each of the financial transactions identified in the transaction log 136, an identity of a party receiving the funds in connection with each of the financial transactions identified in the transaction log 136, and a date of completion for each of the financial transactions identified in the transaction log 136. In an aspect, the information indicated in the transaction log 136 may be determined based on governmental regulations (e.g., regulations imposed upon the controlled facility and/or the money transfer agent operating the agent device 120 by the government agency 180) and self-imposed regulations (e.g., regulations that the money transfer entity and/or the controlled facility impose on themselves). Stated another way, the information included in the transaction log 136 may be determined such that the transaction log 136 may be used to prove up compliance with the governmental and self-imposed regulations. It is noted that the information described above is by way of illustration, rather than by way of limitation, and other information may be identified in the transaction log 136.

Further, it is noted that while the database 130 is shown as being stored at the memory 124 of the agent device 120, in an aspect, the database 130 may be stored external to the agent device 120. For example, the database 130 may be stored at a memory (not shown in FIG. 1) of the central server 160, and may be accessible to the agent device 120 via the network 170 using the communication interface 128. Alternatively or additionally, the database 130 may be stored at an external memory device (not shown in FIG. 1) that is coupled to the agent device 120, such as a network attached storage device (not shown in FIG. 1) coupled to the network 170 and accessible to the agent device 120 via the network 170 using the communication interface 128, or an external storage device (not shown in FIG. 1) coupled to the agent device 120 as one of the I/O devices 138. It is noted that the database 130 may be a distributed database stored across a plurality of storage devices that may be geographically distributed or may be centrally located.

The communication interface 128 may be configured to communicatively couple the agent device 120 to one or more networks, such as the network 170, via a wired or wireless connection established according to one or more communication protocols or standards (e.g., an Ethernet protocol, a TCP/IP protocol, IEEE 802.11 protocol, and an IEEE 802.16 protocol, a 3G protocol, a 4G/LTE protocol, etc.). In an aspect, the agent device 120 may be a laptop computing device, a personal computing device, a tablet computing device, a point of sale (POS), a handheld POS, a smartphone, a mobile communication device, or any other electronic device operable to perform the operations of the agent device 120, as described with reference to FIGS. 1-5. The agent device 120 may include or may be coupled to one or more input/output (I/O) devices 138. The I/O devices 138 may include a money order printer, a signature pad, a camera, a pin pad module, a financial card reader, a biometric scanner, a receipt printer, another printing device, a barcode scanner, a metering device, a weight sensor, a check reader, a mouse, a keyboard, a touchscreen display device, a printer, a card scanner, a numeric keypad, a check reader, other types of input and output devices, or a combination thereof.

The electronic device 140 may by operated under the control of an operator of the controlled facility. As shown in FIG. 1, the electronic device 140 includes a processor 142, a memory 144, and a communication interface 148. In an aspect, the electronic device 140 may be a server that provides an intranet and/or provides other devices (e.g., the kiosk device 110) with access to the network 170, a laptop computing device, a personal computing device, a tablet computing device, a POS, a handheld POS, a smartphone, a mobile communication device, or any other electronic device operable to perform the operations of the electronic device 140, as described herein with reference to FIGS. 1-5. The memory 144 may include ROM devices, RAM devices, one or more HDDs, flash memory devices, SSDs, other devices configured to store data in a persistent or non-persistent state, or a combination of different memory devices. The memory 144 may store instructions 146 that, when executed by the processor 142, cause the processor 142 to perform operations described in connection with the electronic device 140 with reference to FIGS. 1-5. The communication interface 148 may be configured to communicatively couple the electronic device 140 to one or more networks, such as the network 170, via a wired or wireless connection established according to one or more communication protocols or standards (e.g., an Ethernet protocol, a TCP/IP protocol, IEEE 802.11 protocol, and an IEEE 802.16 protocol, a 3G protocol, a 4G/LTE protocol, etc.).

The memory 144 may store a database 150 that stores information that is to be used to in conjunction with providing financial services to the residents (e.g., the resident 102) of the controlled facility. The information may include authorization information 152, rules 156, and account information 154. In an aspect, the authorization information 152 may include the same information as the authorization information 132. For example, the authorization information 152 may include information that identifies entities (e.g., persons, business, financial accounts, other residents of the controlled facility, etc.) that the resident 102 (or other residents) of the controlled facility may be authorized to transfer funds to, and entities that the resident of the controlled facility is authorized to receive funds from. In an aspect, the authorization information 152 may include username and password information that may be used to authenticate residents in connection with providing financial transaction services to the residents of the controlled facility.

In an aspect, the rules 156 include the same rules as the rules 134. For example, the rules 156 may include rules that are to be used to determine whether a particular transaction requested by the resident 102 (or another resident) can be initiated. To illustrate, the rules 156 may include a first rule indicating that a particular resident is able to participate in a threshold number of financial transactions during a time period (e.g., a day, a week, a month, etc.). Additionally or alternatively, the rules 156 may include a second rule indicating that the particular resident is able to participate in financial transactions having a total value up to a threshold value during the time period. In an aspect, the rules 156 may be applied collectively. For example, for a particular financial transaction requested by the resident 102, the system 100 may determine whether to authorize the initiation of the particular financial transaction by determining whether the resident 102 has participated in the threshold number of financial transactions during the time period, and whether the total value of financial transactions that the resident 102 has participated in during the time period exceeds the threshold value.

In an additional or alternative aspect, different residents of the controlled facility may have different rules applied to their respective requests to initiate financial transactions. For example, a first resident may have only the first rule applied to requests to initiate financial transactions, a second resident may have only the second rule applied to requests to initiate financial transactions, and a third resident may have both the first rule and the second rule applied to requests to initiate financial transactions. The particular rules applied to a resident's requests to initiate financial transactions may be selectively configured by an operator of the controlled facility and/or by an operator of the money transfer entity operating the agent device 120. In an aspect, the rules applied to a particular resident may be determined based on governmental regulations (e.g., regulations imposed upon the controlled facility and/or the money transfer agent operating the agent device 120 by the government agency 180).

The rules 156 may include a third rule indicating that a requested financial transaction is to be denied if the financial transaction would cause the account of the resident 102 to have a negative balance. Information associated with a current balance of the resident 102 may be retrieved by the electronic device 140 in response to receiving a request to initiate financial transactions (e.g., from the kiosk device 110). In an aspect, the electronic device 140 may transmit information (e.g., an account balance, account number, etc.) associated with the account of the resident 102 to the agent device 120 in response to authorizing a transaction. It is noted that the rules described above are by way of illustration, rather than by way of limitation, and the rules 156 may include other rules not described herein for simplicity of description.

In an aspect, the database 150 may include a transaction log (not shown in FIG. 1) that includes the information indicated in the transaction log 136. The transaction log stored at the database 150 may be associated with the resident 102 of the controlled facility and may identify financial transactions that the resident 102 of the controlled facility has participated in. In an aspect, the transaction log stored at the database 150 may be associated with a plurality of residents and may identify financial transactions that each of the residents of the controlled facility has participated in. The financial transactions identified in the transaction log stored at the database 150 may include purchases, telephone call logs, bills paid, money transfers to and from an account of each of the residents of the controlled facility, pending financial transactions, other types of financial transactions involving an exchange of funds in connection with the account of each of the residents of the controlled facility, or a combination thereof. The transaction log may indicate a value for each of the financial transactions identified in the transaction log stored at the database 150, an identity of a party providing funds in connection with each of the financial transactions identified in the transaction log stored at the database 150, an identity of a party receiving the funds in connection with each of the financial transactions identified in the transaction log stored at the database 150, and a date of completion for each of the financial transactions identified in the transaction log stored at the database 150. In an aspect, the information indicated in the transaction log stored at the database 150 may be determined based on governmental regulations (e.g., regulations imposed upon the controlled facility and/or the money transfer agent operating the agent device 120 by the government agency 180). It is noted that the information described above is by way of illustration, rather than by way of limitation, and other information may be identified in the transaction log stored at the database 150. Also it is noted that the information included in the transaction log stored at the database 150 may be the same as or different from the information included in the transaction log 136.

The account information 154 may include information associated with accounts of the residents of the controlled facility. For example, the account information 154 may identify, for each account, a resident associated with the account, a balance of the account, a beneficiary associated with the account, and other information. In an aspect, the account information 154 may include username and password information that may be used to authenticate residents in connection with providing financial transaction services to the residents of the controlled facility.

In an aspect, the account information 154 may include, for each resident, a user profile for each resident of the controlled facility. For example, the user profile for the resident 102 may identify the account of resident 102, a balance of the account of resident 102, a beneficiary associated with the account of resident 102, and a username and password used by the resident 102 to log-in to the kiosk device 110 to initiate a financial transaction, view account balance information, etc. Additionally, the profile may include a category associated with the resident 102. The rules 156 may be associated with different categories and selectively applied to financial transactions based on a category associated with the profile of a particular resident requesting a financial transaction. For example, the category associated with the profile of the resident 102 may indicate that the first rule is to be applied to requests to initiate financial transactions, while a different category associated with another profile of another resident of the controlled facility may indicate that both the first rule and the second rule are to be applied to requests to initiate financial transactions by the other resident. Categorizing resident profiles and associating different profile categories with different rule sets may simplify administration of the system 100 (e.g., by enabling rules to be applied to requests to initiate financial transactions to a class of users, as opposed to manually configuring the rules for each user).

It is noted that while the database 150 is shown as being stored at the memory 144 of the electronic device 140, in an aspect, the database 150 may be stored external to the electronic device 140. For example, the database 150 may be stored at a memory (not shown in FIG. 1) of an electronic device (not shown in FIG. 1) under the control of the government agency 180 and/or the controlled facility, and may be accessible to the electronic device 140 via the network 170 using the communication interface 148. Alternatively or additionally, the database 150 may be stored at an external memory device (not shown in FIG. 1) that is coupled to the electronic device 140, such as a network attached storage device (not shown in FIG. 1) coupled to the network 170 and accessible to the electronic device 140 via the network 170 using the communication interface 148, or an external storage device (not shown in FIG. 1) coupled to the electronic device 140 via an I/O device (not shown in FIG. 1). It is noted that the database 150 may be a distributed database stored across a plurality of storage devices that may be geographically distributed or may be centrally located.

The agent device 120 may be one of many agent devices 120 located at a money transfer location operated by a money transfer entity that provides money transfer services between a sending party and a receiving party. The money transfer location may be a brick-and-mortar location, or may be located within a brick-and-mortar location of another entity, such as within a grocery store or within the controlled facility. In addition to providing money transfer services, the money transfer entity (e.g., an operator of the agent device 120) may provide authentication services on behalf of one or more third parties (e.g., the controlled facility associated with the electronic device 140). The authentication services may include authenticating a resident 102 and/or a third party 104 in connection with a financial transaction between the resident 102 of the controlled facility and the third party 104. Authenticating the resident 102 and/or the third party 104 may include verifying the identity of the resident 102 and/or the third party 104, verifying one or more traits of the resident 102 and/or the third party 104 (e.g., age, birthdate, hair color, eye color, height, etc.), verifying a signature of the resident 102 and/or the third party 104, obtaining a biometric sample from the resident 102 and/or the third party 104, or other information, as described in detail below. The authentication of the resident 102 and/or the third party 104 by the money transfer entity may facilitate completion of the financial transaction between the resident 102 and the third party 104. The money transfer entity may charge the resident 102, the third party 104, the operator of the electronic device 140 (which may be the third party), and/or another entity a fee for providing the authentication services in connection with the financial transaction. In some aspects, the fee may vary based on a type of authentication to be performed, a number of authentications to be performed, etc.

The system 100 facilitates authentication of information associated with the resident 102 in connection with a financial transaction between the resident 102 and the third party 104 (or another resident of the controlled facility). For example, during operation, the electronic device 140 may receive a request to initiate the financial transaction. In an aspect, the request may be generated by the resident 102 using the kiosk device 110. For example, the resident 102 may use an application executing on the kiosk device 110 to generate the request to initiate the financial transaction. In an aspect, the application may be stored as the instructions 116 at the memory 114 of the kiosk device 110. Depending on a particular configuration of the system 100, the request may be provided from the kiosk device 110 to the agent device 120 directly (e.g., without being provided to the electronic device 140), or may be provided from the kiosk device 110 to the electronic device 140 and then to the agent device 120. Additional aspects of routing the request for processing of the financial transaction are described below. In another additional or alternative aspect, the request may be received at the electronic device 140 (or the kiosk device 110) from the agent device 120. For example, the financial transaction associated with the request may correspond to a request to transfer funds from the third party 104 to the resident 102 or to an account associated with the resident 102.

The request may identify a first party that is providing funds in connection with the financial transaction and a second party that is receiving funds in connection with the financial transaction. At least one party to the financial transaction is a resident (e.g., the resident 102) of the controlled facility. The request may also indicate a type of financial transaction associated with the request. The type of the financial transaction may include an inbound money transfer (e.g., a transfer of money to the account of the resident 102 by the third party 104), an outbound money transfer (e.g., a transfer of money from the account of the resident 102 to the third party 104), a purchase (e.g., renewal of a magazine subscription, payment of a recurring or one-time bill payment, a purchase of goods from a store provided by the controlled facility or an online retailer, payment for a service provided to the resident 102, etc.), or any other type of financial transaction that may require an exchange of funds to/from the account associated with the resident 102. The controlled facility has access to the account of the resident 102, and has authority to authorize and/or deny financial transactions associated with the resident 102.

In an illustrative example, when the financial transaction is a money transfer transaction, the request may include a request to transfer money from the account of the resident 102 to the third party 104 (e.g., the outbound money transfer type), or may include a request to transfer money from the third party 104 (or an account of the third party 104) to the account of the resident 102 (e.g., the inbound money transfer type). In response to receiving the request, the electronic device 140 (or the agent device 120) may determine whether the resident 102 is authorized to participate in the financial transaction based on authorization information (e.g., the authorization information 132 and/or the authorization information 152 of FIG. 1) stored in a database (e.g., the database 130 and/or the database 1 of FIG. 1) accessible to the electronic device 140 (or the agent device 120).

As explained above, the authorization information may identify entities that the resident 102 is authorized to transfer funds to, and entities that the resident 102 is authorized to receive funds from. When the request indicates the outbound money transfer type, determining whether the resident 102 is authorized to participate in the financial transaction may include determining whether the third party 104 that is to receive funds from the resident 102 in connection with the financial transaction corresponds to one of the entities that the resident 102 is authorized to transfer funds to, as indicated by the authorization information. If the entity receiving the funds from the resident 102 is not an authorized entity, as indicated by the authorization information, the request to initiate the financial transaction may be denied. If the entity receiving the funds from the resident 102 is an authorized entity, as indicated by the authorization information, the request to initiate the financial transaction may be authorized.

When the request indicates the inbound money transfer type, determining whether the resident 102 is authorized to participate in the financial transaction may include determining whether the third party 104 that is to provide funds to the resident 102 in connection with the financial transaction corresponds to one of the entities that the resident 102 is authorized to receive funds from, as indicated by the authorization information. If the entity providing the funds to the resident 102 is not indicated as an authorized entity by the authorization information, the request to initiate the financial transaction may be denied. If the entity providing the funds to the resident 102 is indicated as an authorized entity by the authorization information, the request to initiate the financial transaction may be authorized. In an aspect, the entities identified in the authorization information may be determined by the controlled facility operating the electronic device 140 and/or the money transfer entity operating the agent device 120.

In addition to authorizing the financial transaction based on the parties associated with the transaction (e.g., the party receiving funds and the party providing the funds), the authorization of the financial transaction may also be determined based on rules (e.g., the rules 134 and/or the rules 156). As described above, the rules may associated with regulatory requirements imposed on the controlled facility in connection with overseeing the account of the resident 102, and/or regulatory requirements imposed on the money transfer entity in connection with providing the financial transaction services to the residents of the controlled facility. The rules may be imposed by a government entity (e.g., the government agency 180), by the operator of the controlled facility, and/or by the money transfer entity.

To illustrate, a first rule may require that withdrawal of funds from or deposits of funds into the account of the resident 102 be limited to a threshold number of financial transactions during a period of time (e.g., one financial transaction per day, three financial transactions per week). Thus, authorizing the financial transaction in response to the request may include determining a number of financial transactions that the resident 102 participated in during a period of time, and determining whether the number of financial transactions that the resident 102 participated in during the period of time exceeds the threshold number of financial transactions. The financial transaction may be authorized or initiated based, at least in part, on whether the number of financial transactions that the resident 102 participated in during the period of time exceeds the threshold number of financial transactions. For example, if the first rule indicates that the resident 102 is permitted to participate in one transaction per day, the request may be denied if the resident 102 has previously participated in a financial transaction on the day the request was received, and may be authorized if the resident 102 has not previously participated in a financial transaction on the day the request was received.

In an additional or alternative aspect, the period of time may be different for different types of financial transactions. For example, money transfers may be limited to a single money transfer (e.g., one inbound money transfer or one outbound money transfer) per day, one inbound money transfer and one outbound money transfer per day, or some other criteria, while other financial transactions may be limited to a different of financial transactions per day. The resident 102 may be limited to a single money transfer per day, but may participate in two purchases per day. Thus, determining whether the resident 102 is authorized to participate in a particular financial transaction may include determining a type of the financial transaction, and whether the resident 102 has participated in a threshold number of financial transactions of that type during a time period. When the resident 102 has participated in the threshold number of financial transactions for a particular financial transaction type, requests to initiate additional financial transactions of the particular financial transaction type may be denied, but requests to initiate other financial transactions of a different financial transaction type may be authorized if the resident has not participated in the threshold number of financial transactions for the different financial transaction type during the time period.

In an aspect, requests to initiate a financial transaction may be scheduled in advance, such as for recurring payments or future purchases. In such instances, the date the financial transaction is scheduled to occur on, as opposed to the date the request is received, may be used to determine whether to authorize the financial transaction. Thus, in some situations, the system 100 may authorize a financial transaction requested to occur in the future even though, on the day that the future financial request was received, the resident 102 has already participated in the threshold number of financial transactions indicated by the first rule.

Additionally or alternatively, the rules (e.g., the rules 134 and/or the rules 156) may include a second rule that requires a total value of financial transactions that the resident 102 participates in during a period of time satisfy a threshold value. Determining whether to authorize the requested financial transaction may include determining a value of financial transactions that the resident 102 has participated in during a period of time. In an aspect, the value of the financial transactions that the resident 102 has participated in during the period of time may be determined based on a transaction log (e.g., the transaction log 136 and/or the transaction log stored at the database 150). In an aspect, the value of the financial transactions may correspond to a total value of all financial transactions that the resident 102 has participated in during the period of time. In an additional or alternative aspect, the value of the financial transactions may correspond to a total value of all financial transactions of a particular financial transaction type (e.g., inbound money transfers, outbound money transfers, purchases, etc.) that the resident 102 has participated in during the period of time.

The electronic device 140 (or the agent device 120) may determine whether the value of the financial transactions that the resident 102 participated in during the period of time exceeds a threshold value. In an aspect, the threshold value may be associated with all financial transactions that the resident 102 has participated in during the period of time irrespective of a type of the financial transactions. In an additional or alternative aspect, multiple threshold values may be specified, with each threshold value corresponding to a particular financial transaction type. In such instances, the threshold value used to determine whether the value of the financial transactions that the resident 102 participated in during the period of time exceeds the threshold value may be determined based on a financial transaction type associated with the requested financial transaction. Thus, a first requested financial transaction of a first financial transaction type (e.g., a money transfer) may be selectively authorized based on a first threshold value (e.g., a threshold value associated with the first financial transaction type), and a second requested transaction of a second financial transaction type (e.g., a purchase) may be selectively authorized based on a second threshold value (e.g., a threshold value associated with the second financial transaction type).

The requested financial transaction may be initiated based, at least in part, on whether the value of the financial transactions that the resident 102 participated in during the period of time exceeds the threshold value. For example, when the value of the financial transactions that the resident 102 participated in during the period of time does not exceed the threshold value, the electronic device 140 (or the agent device 120) may authorize the requested financial transaction. When the electronic device 140 authorizes the financial transaction, the electronic device 140 may transmit the request to the agent device 120 with an indication that the financial transaction has been authorized, and the agent device 120 may perform processing to complete the financial transaction, as described in more detail below. When the agent device 120 authorizes the financial transaction, the agent device 120 may transmit an indication that the requested financial transaction has been authorized to the electronic device 140 and perform further processing to complete the financial transaction.

If the value of the financial transactions that the resident 102 participated in during the period of time exceeds the threshold value, the electronic device 140 (or the agent device 120) may deny the requested financial transaction. When the electronic device 140 denies the financial transaction, the electronic device 140 may not transmit the request to the agent device 120 and may create an entry in the transaction log stored at the database 150 that indicates a denied financial transaction. The entry in the transaction log may include information indicating a reason for the denial of the requested financial transaction (e.g., insufficient funds in the account of the resident 102, number of transactions during the time period exceeded, threshold value of financial transactions exceeded, etc.). In such instances, the agent device 120 may not receive the request from the electronic device 140. When the agent device 120 denies the financial transaction, the agent device 120 may transmit information indicating that the requested financial transaction has been denied to the electronic device 140. The information indicating that the requested financial transaction has been denied may include a reason why the requested financial transaction was denied (e.g., insufficient funds in the account of the resident 102, number of transactions during the time period exceeded, threshold value of financial transactions exceeded, etc.) to the electronic device 140. The electronic device 140 and the agent device 120 may create an entry associated with the denied financial transaction in the transaction logs maintained at the respective databases. The information indicating that the requested financial transaction has been denied may also be provided to the kiosk device 110, which may present the information to the resident 102 to inform the resident that the financial transaction has been denied and the reason why the financial transaction was denied.

In response to a determination that the resident is authorized to participate in the financial transaction the financial transaction may be initiated. For example, when the authorization is performed by the electronic device 140, initiating the financial transaction may include transmitting the request to the agent device 120 for further processing and to complete the financial transaction, as described in more detail below. When the authorization is performed by the agent device 120, initiating the financial transaction may cause the agent device 120 to complete the financial transaction.

Completing the financial transaction may include performing a money transfer (e.g., an inbound money transfer, an outbound money transfer, or both), authorizing payment for a purchase, or scheduling a future payment. For example, when the financial transaction is an outbound money transfer between the resident 102 and the third party 104 (or another resident), the agent device 120 may generate a transaction identifier. The transaction identifier may be a unique code that may be used by the third party 104 to obtain funds from the money transfer entity operating the agent device 120. To illustrate, the request associated with the authorized financial transaction may indicate an amount of the money transfer, account information associated with the account of the resident 102, an identity of the third party 104 (or the other resident) that is to receive funds in connection with the money transfer, and an e-mail address associated with the third party 104. The agent device 120 may generate and transmit an e-mail message to the third party 104 using the e-mail address included in the request. The e-mail message may include the transaction identifier generated by the agent device 120. The third party 104 may then visit a location associated with the money transfer entity that operates the agent device 120 and present the transaction identifier to receive the funds in connection with the money transfer requested by the resident 102. The location where the transaction identifier is presented may be a same location as a location of the agent device 120, or may be a different location associated with another agent device (not shown in FIG. 1) operated by the money transfer entity.

The agent device 120 may be configured to withdraw funds corresponding to the amount of the financial transaction from the account of the resident 102 in connection with the money transfer. The withdrawal of funds from the account of the resident 102 may occur at the time the transaction identifier is provided to an employee of the money transfer entity by the third party 104, or may be withdrawn upon authorizing the financial transaction. As the financial transactions are executed by the agent device 120, the account information 154 stored at the database 150 may be updated to reflect the withdrawal of funds from, or depositing of funds into, the account associated with the resident 102. The money transfer entity and/or the controlled facility may charge a fee for providing the financial transaction to the resident 102, and the fee may be withdrawn from the account of the resident 102.

In an additional or alternative aspect, the request may include account information associated with an account of the third party 104 (or another resident), and the agent device 120 may initiate an account to account money transfer that causes funds to be withdrawn from the account of the resident 102 and deposited into the account of the third party 104 (or the other resident). In this scenario, the agent device 120 may generate and transmit an e-mail message to an e-mail address associated with the third party 104 (or the other resident) indicating that the money transfer has been completed and including the transaction identifier that identifies the completed financial transaction.

When the financial transaction is associated with a money transfer between the resident 102 and another resident of the controlled facility (or another controlled facility), the e-mail message generated by the agent device 120 may include a transaction identifier that may be provided as an input to the kiosk device 110 to complete the exchange of funds. For example, the e-mail message may be transmitted to an e-mail message associated with the other resident, and the other resident may provide the transaction identifier as an input to the kiosk device 110, which causes the funds to be transferred to an account associated with the other resident. In an additional or alternative aspect, the e-mail message may indicate that the money transfer has been completed, and the other resident may use the kiosk device 110 to verify that the funds have been deposited in the account associated with the other resident.

When the financial transaction is associated with a money transfer from the third party 104 (or the other resident) to the resident 102, the e-mail message generated by the agent device 120 may include a transaction identifier that may be provided as an input to the kiosk device 110 to complete the exchange of funds. For example, the e-mail message may be transmitted to an e-mail message associated with the resident 102, and the resident 102 may provide the transaction identifier as an input to the kiosk device 110, which causes the funds to be transferred to the account associated with the resident 102. In an additional or alternative aspect, the e-mail message may indicate that the money transfer has been completed, and the resident 102 may use the kiosk device 110 to verify that the funds have been deposited in the account associated with the resident 102.

When the financial transaction is associated with a purchase made by the resident 102, the agent device 120 may deduct the funds from the account of the resident 102 and initiate an electronic funds transfer to an account associated with an entity from which the purchase is being made, such as an online retailer, a store operated by the controlled facility, etc. The agent device 120 may transmit an e-mail message to the e-mail address associated with the resident 102 indicating that payment for the purchase has been completed. When the financial transaction is associated with a payment of a bill, the agent device 120 may deduct the funds from the account of the resident 102 and initiate an electronic funds transfer to an account associated with an entity for which the bill is being paid, such as a health insurance provider, a mortgage lender, etc. The agent device 120 may transmit an e-mail message to the e-mail address associated with the resident 102 indicating that bill has been paid. The agent device 120, in conjunction with the kiosk device 110 and the electronic device 140, may facilitate other types of financial transactions, and the financial transactions described herein are provided for purposes of illustration, rather than by way of limitation.

The agent device 120 may generate and transmit a report to the electronic device 140. The report may include a transaction log associated with the resident 102. The transaction log may identify financial transactions that the resident 102 participated in during a period of time. For example, the transaction log may indicate a value for each of the financial transactions that the resident 102 participated in during the period of time, an identity of a party providing funds in connection with each of the financial transactions that the resident 102 participated in during the period of time, an identity of a party receiving the funds in connection with each of the financial transactions that the resident 102 participated in during the period of time, and a date of completion for each of the financial transactions that the resident 102 participated in during the period of time. The report may include other information associated with the financial transactions that the resident 102 participated in during the period of time. For example, the report may include other information associated with the financial transactions, such as telephone call logs (e.g., in connection with financial transactions associated with long distance telephone service, cellular telephone service, or other telecommunications related services), information identifying goods purchased, information identifying bills paid, information identifying debits and credits of the account associated with the resident 102, information identifying pending money transfers, information identifying completed money transfers, or a combination thereof.

The electronic device 140 may receive the report from the agent device 120. The report may be stored in the database 150 and may be used for regulation compliance audits or other purposes as needed by the operator of the controlled facility. In an aspect, the electronic device 140 may initiate transmission of an audit request to the agent device 120, and the agent device 120 may generate and transmit the report to the electronic device 140 in response to the audit request. The audit request may identify a period of time, and the financial transactions identified in the transaction log correspond to financial transactions that occurred during the period of time. In an aspect, all or a portion of the processing performed by the agent device 120 in connection with authorizing and completing financial transactions and providing reports to the electronic device 140 may be performed by the central server 160.

The system 100 of FIG. 1 may provide financial services to residents of a controlled facility with a reduced administrative burden. For example, the kiosk device 110 enables the resident 102 to request a financial transaction without requiring personnel of the controlled facility to be physically involved in the authorization of the financial transaction. Further, the agent device 120 and/or the electronic device 140 are configured to authorize requested financial transactions based on the rules 134 and 156, respectively, ensuring that executed financial transactions are in compliance with any regulations imposed on the controlled facility and/or the money transfer entity. Additionally, the system 100 facilitates the creation of reports that may be generated periodically or on-demand that may be used for auditing purposes, such as to prove up that the controlled facility is in compliance with the regulations. The system 100 may also reduce an amount of delay for completing financial transactions and provide for faster completion of the financial transactions. Further, by utilizing the authorization information (e.g., the authorization information 132 and/or the authorization information 152) the system 100 may reduce a likelihood that unauthorized financial transactions are executed on behalf of residents of the controlled facility.

Another advantage provided by the system 100 is the ability to control authorization of financial transactions on a per resident basis, whereby different the rules (e.g., the rules 134 and/or the rules 156) may be tailored to specific circumstances associated with each of the residents of the controlled facility. For example, in a prison system, additional rules for conducting financial transactions may be imposed on a person convicted of a financial crime or known to have ties to organized criminal activity than a person convicted of a non-financial crime or a person that does not have ties to organized criminal activity. Applying different rules to different classes of residents may be further simplified by classifying profiles associated with the residents into different categories.

Figure 2:
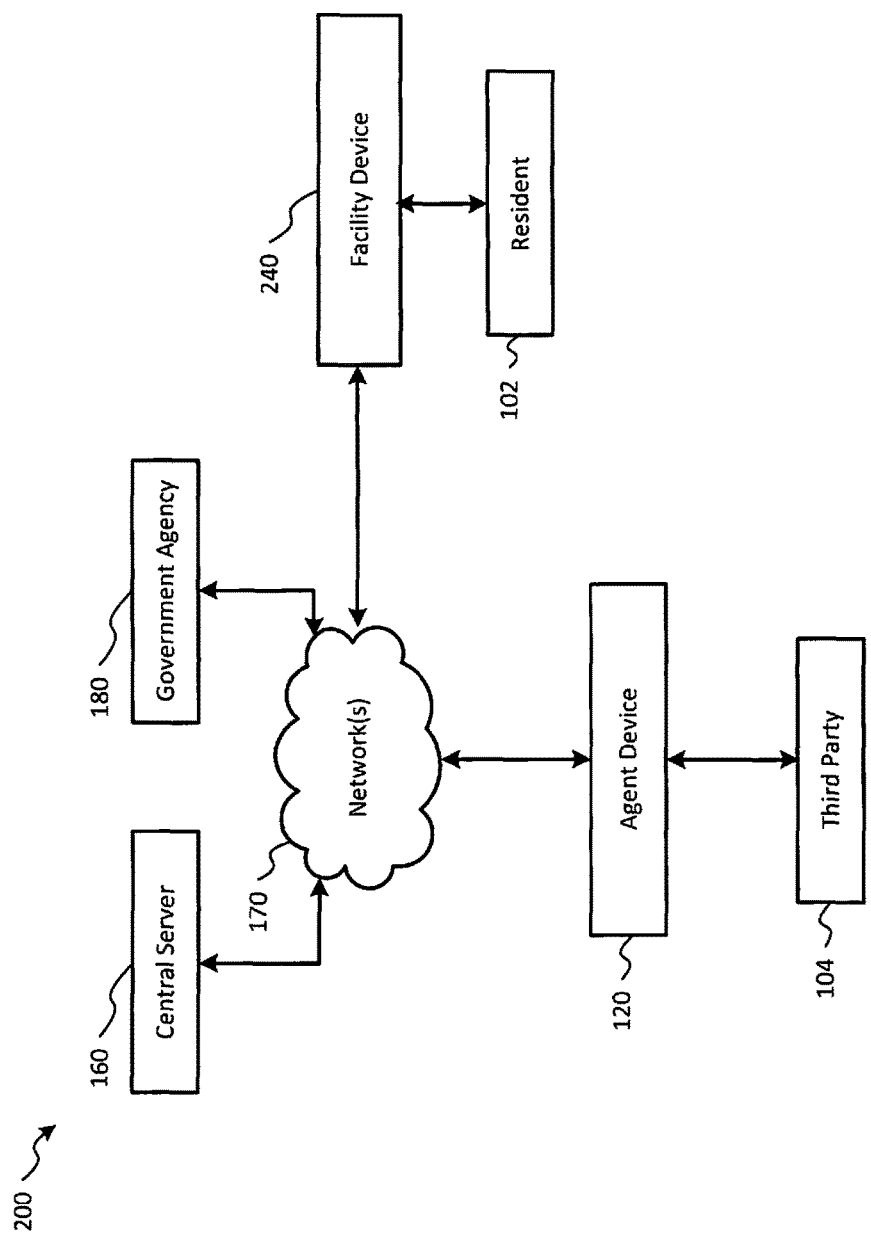
FIG. 2 illustrates a block diagram of another system for providing financial transaction services to residents of a controlled facility.

Referring to FIG. 2, a block diagram of another system for providing financial transaction services to residents of a controlled facility is shown as a system 200. As shown in FIG. 2, the system 200 includes the agent device 120 of FIG. 1, the central server 160 of FIG. 1, and the government agency 180 of FIG. 1. In FIG. 2, the kiosk device 110 of FIG. 1 and the electronic device 140 of FIG. 1 have been integrated into a single electronic device, shown as an electronic device 240. The electronic device 240 may provide all of the functionality described with reference to the electronic device 140 of FIG. 1 and all of the functionality described with reference to the kiosk device 110 of FIG. 1.

For example, the resident 102 (or an agent assisting the resident 102) may interact with various graphical user interfaces presented at a display device (not shown in FIG. 2) of the electronic device 240 to request financial transaction services, such as the exemplary financial transaction services described in connection with FIG. 1. The electronic device 240 may authorize the requests based on authorization information (e.g., the authorization information 152 of FIG. 1) stored in a memory (not shown in FIG. 2) of the electronic device 240. Additionally, the electronic device 240 may transmit request associated with authorized financial transactions to the agent device 120, as described with reference to FIG. 1, or may permit the agent device 120 to authorize the financial transactions, as described with reference to FIG. 1. As additionally shown in FIG. 2, a third party may utilize the agent device 120 to initiate financial transactions with the resident 102.

The system 200 of FIG. 2 may provide financial services to residents of a controlled facility with a reduced administrative burden. For example, the electronic device 240 enables the resident 102 to request a financial transaction without requiring personnel of the controlled facility to be physically involved in the authorization of the financial transaction. Further, the agent device 120 and/or the electronic device 240 are configured to authorize requested financial transactions based on the rules (e.g., the rules 134 and 156 of FIG. 1), ensuring that executed financial transactions are in compliance with any regulations imposed on the controlled facility and/or the money transfer entity. Additionally, the system 200 facilitates the creation of reports that may be generated periodically or on-demand that may be used for auditing purposes, such as to prove up that the controlled facility is in compliance with the regulations. The system 200 may also reduce an amount of delay for completing financial transactions and provide for faster completion of the financial transactions. The system 200 of FIG. 2 may be deployed at reduced cost compared to the system 100 of FIG. 1 because, in the system 200, the kiosk device 110 has been integrated into the electronic device 140 as the electronic device 240. Further, by utilizing the authorization information (e.g., the authorization information 132 and/or the authorization information 152 of FIG. 1) the system 200 may reduce a likelihood that unauthorized financial transactions are executed on behalf of residents of the controlled facility.

Another advantage provided by the system 200 is the ability to control authorization of financial transactions on a per resident basis, whereby different the rules (e.g., the rules 134 and/or the rules 156 of FIG. 1) may be tailored to specific circumstances associated with each of the residents of the controlled facility. For example, in a prison system, additional rules for conducting financial transactions may be imposed on a person convicted of a financial crime or known to have ties to organized criminal activity than a person convicted of a non-financial crime or a person that does not have ties to organized criminal activity.

Figure 3:
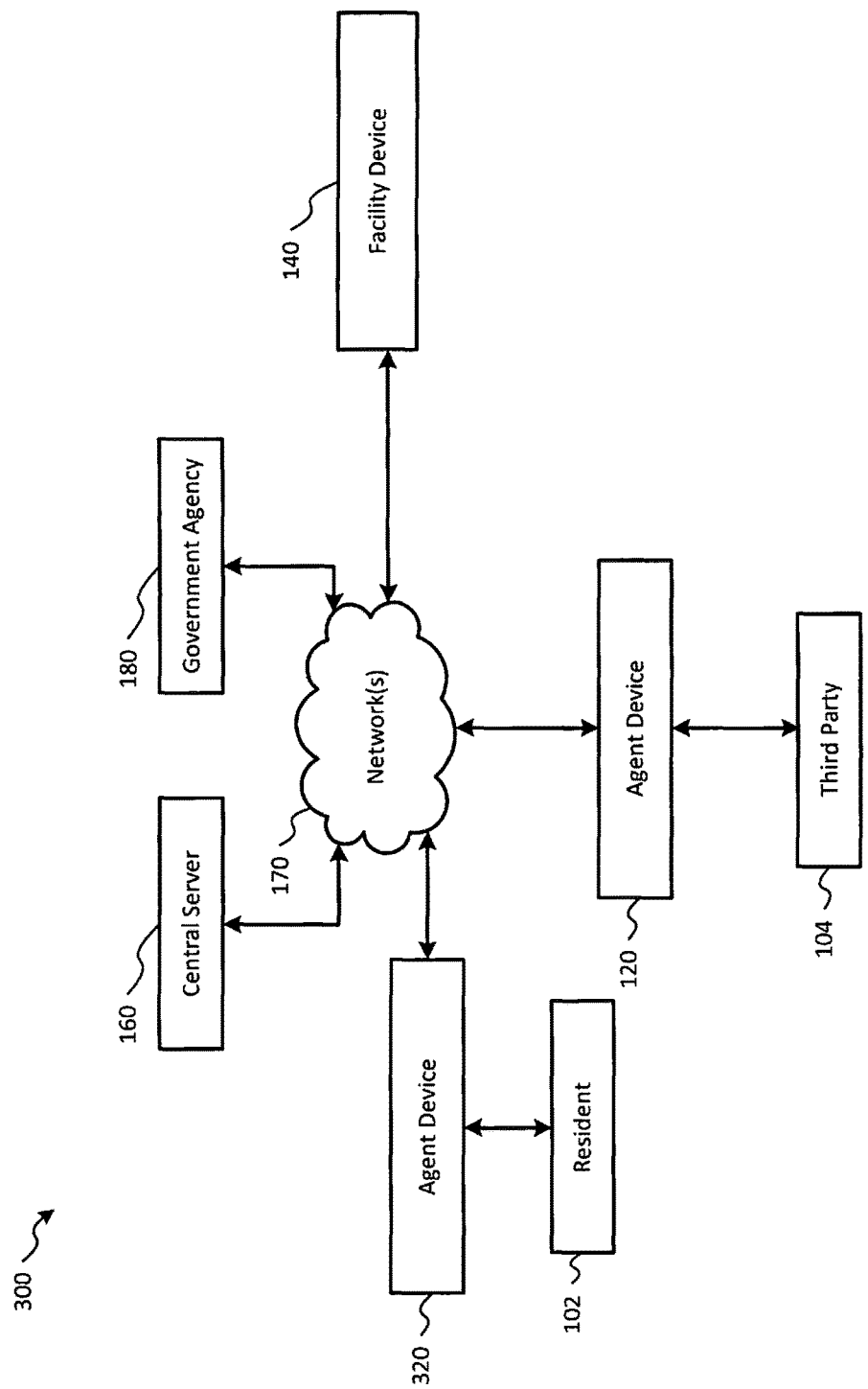
FIG. 3 illustrates a block diagram of yet another system for providing financial transaction services to residents of a controlled facility.

Referring to FIG. 3, a block diagram of yet another system for providing financial transaction services to residents of a controlled facility is shown as a system 300. As shown in FIG. 3, the system 300 includes the agent device 120 of FIG. 1, the electronic device 140 of FIG. 1, the central server 160 of FIG. 1, and the government agency 180 of FIG. 1. In FIG. 3, the kiosk device 110 of FIG. 1 has been integrated with an agent device (e.g., a device similar to the agent device 120 of FIG. 1), and is shown as an agent device 320. The agent device 320 may provide all of the functionality described with reference to the kiosk device 110 of FIG. 1 and all of the functionality described with reference to the agent device 120 of FIG. 1.

For example, the resident 102 (or an agent assisting the resident 102) may interact with various graphical user interfaces presented at a display device (not shown in FIG. 3) of the agent device 320 to request financial transaction services, such as the exemplary financial transaction services described in connection with FIG. 1. The agent device 320 may authorize the requests based on authorization information (e.g., the authorization information 152 of FIG. 1) stored in a memory (not shown in FIG. 3) of the agent device 320. Additionally, the agent device 320 may transmit request associated with authorized financial transactions to the electronic device 140, as described with reference to FIG. 1, or may permit the agent device 120 to authorize the financial transactions, as described with reference to FIG. 1. As additionally shown in FIG. 3, a third party may utilize the agent device 120 to initiate financial transactions with the resident 102.

The system 300 of FIG. 3 may provide financial services to residents of a controlled facility with a reduced administrative burden. For example, the agent device 320 enables the resident 102 to request a financial transaction without requiring personnel of the controlled facility to be physically involved in the authorization of the financial transaction. Further, the agent device 320 and/or the electronic device 140 are configured to authorize requested financial transactions based on the rules (e.g., the rules 134 and 156 of FIG. 1), ensuring that executed financial transactions are in compliance with any regulations imposed on the controlled facility and/or the money transfer entity. Additionally, the system 200 facilitates the creation of reports that may be generated periodically or on-demand that may be used for auditing purposes, such as to prove up that the controlled facility is in compliance with the regulations. The system 300 may also reduce an amount of delay for completing financial transactions and provide for faster completion of the financial transactions. The system 300 of FIG. 3 may be deployed at reduced cost compared to the system 100 of FIG. 1 because, in the system 300, the kiosk device 110 has been integrated into the agent device 320. Further, by utilizing the authorization information (e.g., the authorization information 132 and/or the authorization information 152 of FIG. 1) the system 300 may reduce a likelihood that unauthorized financial transactions are executed on behalf of residents of the controlled facility.

Another advantage provided by the system 300 is the ability to control authorization of financial transactions on a per resident basis, whereby different the rules (e.g., the rules 134 and/or the rules 156 of FIG. 1) may be tailored to specific circumstances associated with each of the residents of the controlled facility. For example, in a prison system, additional rules for conducting financial transactions may be imposed on a person convicted of a financial crime or known to have ties to organized criminal activity than a person convicted of a non-financial crime or a person that does not have ties to organized criminal activity.

Figure 4:
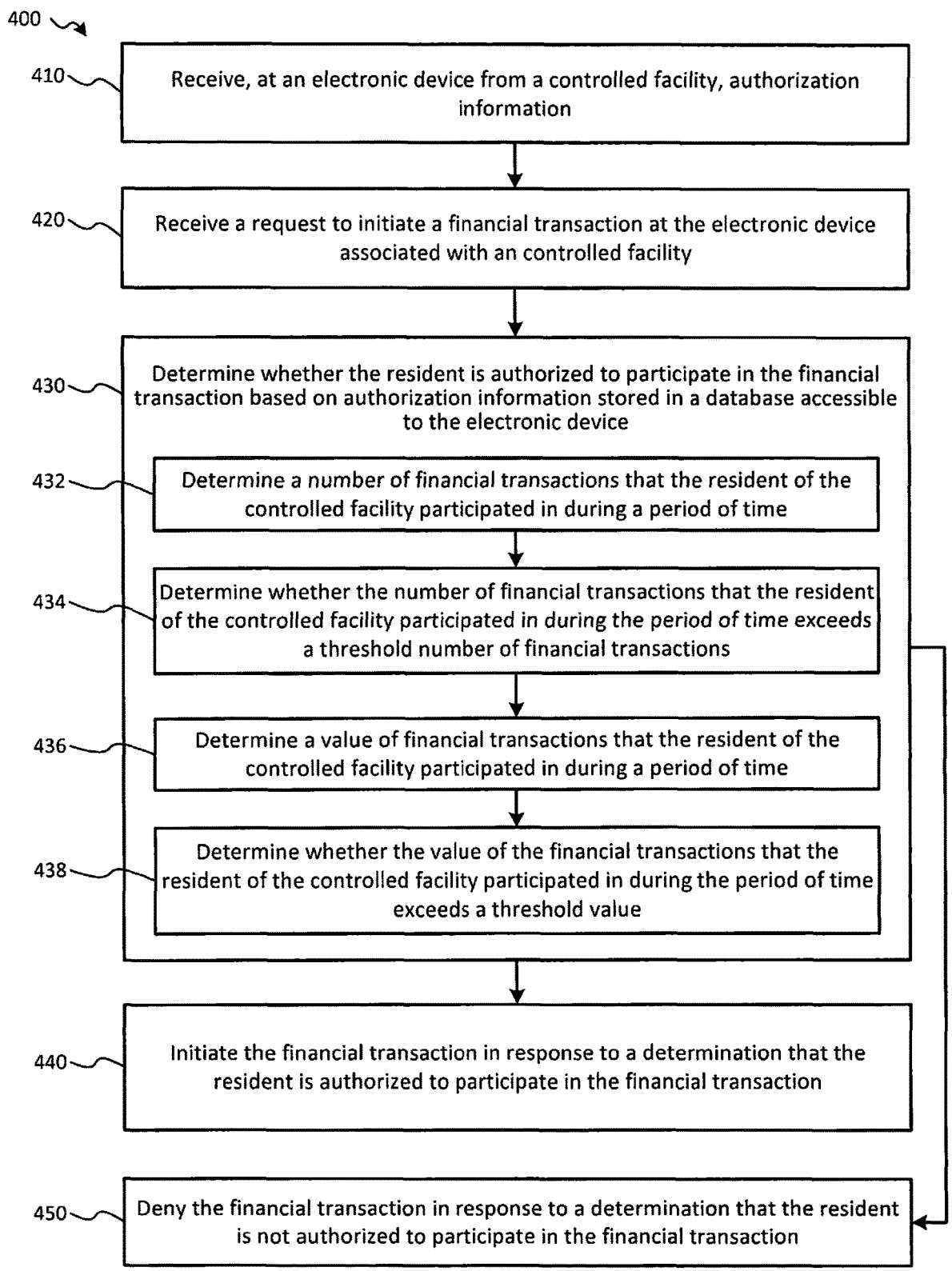
FIG. 4 illustrates a flow chart of a method of providing financial transaction services to residents of a controlled facility.

Referring to FIG. 4, a flow chart of a method of providing financial transaction services to residents of a controlled facility is shown as a method 400. In an aspect, the method 400 may be performed by the kiosk device 110 of FIG. 1, the electronic device 140 of FIG. 1, or the electronic device 240 of FIG. 2. At 410, the method 400 includes receiving, at an electronic device from a controlled facility, authorization information. The authorization information may identify entities that a resident of the controlled facility is authorized to transfer funds to and entities that the resident of the controlled facility is authorized to receive funds from. In an aspect, the authorization information may be the authorization information 152 of FIG. 1 or the authorization information 132 of FIG. 1. At 420, the method 400 includes receiving a request to initiate a financial transaction at an electronic device associated with a controlled facility. At least one party to the financial transaction is a resident of the controlled facility. At 430, the method 400 includes determining whether the resident is authorized to participate in the financial transaction based on the authorization information. In an aspect, the authorization information may be stored in a database accessible to the electronic device. In an aspect, database may be the database 150 of FIG. 1 and the authorization information may be the authorization information 152 of FIG. 1. For example, determining whether the resident is authorized to participate in the financial transaction based on the authorization information stored in the database accessible to the electronic device may include determining whether the party providing funds to the resident in connection with the financial transaction request or receiving funds from the resident in connection with the financial transaction request is identified in the authorization information stored in the database.

In an additional or alternative aspect, the method 400 may include, at 432, determining a number of financial transactions that the resident of the controlled facility participated in during a period of time, and, at 434, determining whether the number of financial transactions that the resident of the controlled facility participated in during the period of time exceeds a threshold number of financial transactions. The electronic device may initiate the financial transaction based, at least in part, on whether the number of financial transactions that the resident of the controlled facility participated in during the period of time exceeds the threshold number of financial transactions. For example, as described above with reference to FIG. 1, the electronic device 140 may authorize the financial transaction when the number of financial transactions that the resident 102 participated in during the period of time is less than the threshold number of financial transactions, and may deny the financial transaction when the number of financial transactions that the resident 102 participated in during the period of time exceeds the threshold number of financial transactions.

In an additional or alternative aspect, the method 400 includes, at 436, determining a value of financial transactions that the resident of the controlled facility participated in during a period of time, and, at 438, determining whether the value of the financial transactions that the resident of the controlled facility participated in during the period of time exceeds a threshold value. The financial transaction may be initiated based, at least in part, on whether the value of the financial transactions that the resident of the controlled facility participated in during the period of time exceeds the threshold value. In an aspect, the method 400 may determine whether the resident is authorized to participate in the financial transaction based on both the number of financial transactions, as indicated at 432 and 434 and the value of the financial transactions that the resident has participated in.

At 440, the method 400 includes, initiating the financial transaction in response to a determination that the resident is authorized to participate in the financial transaction. As described above with reference to FIG. 1, initiating the financial transaction by the electronic device 140 may include transmitting the request to an agent device, such as the agent device 120 of FIGS. 1 and 2, where the agent device completes the financial transaction. At 450, the method 400 includes denying the financial transaction in response to a determination that the resident is not authorized to participate in the financial transaction. As explained above with respect to FIG. 1, the financial transaction may be denied when the number of financial transactions that the resident 102 participated in during the period of time exceeds the threshold number of financial transactions, and/or when the value of the financial transactions that the resident of the controlled facility participated in during the period of time exceeds the threshold value. Additionally, the financial transaction may be denied when a party that is to receive funds from the resident or a party that is to provide funds to the resident in connection with the financial transaction is not identified in the authorization information.

Figure 5:
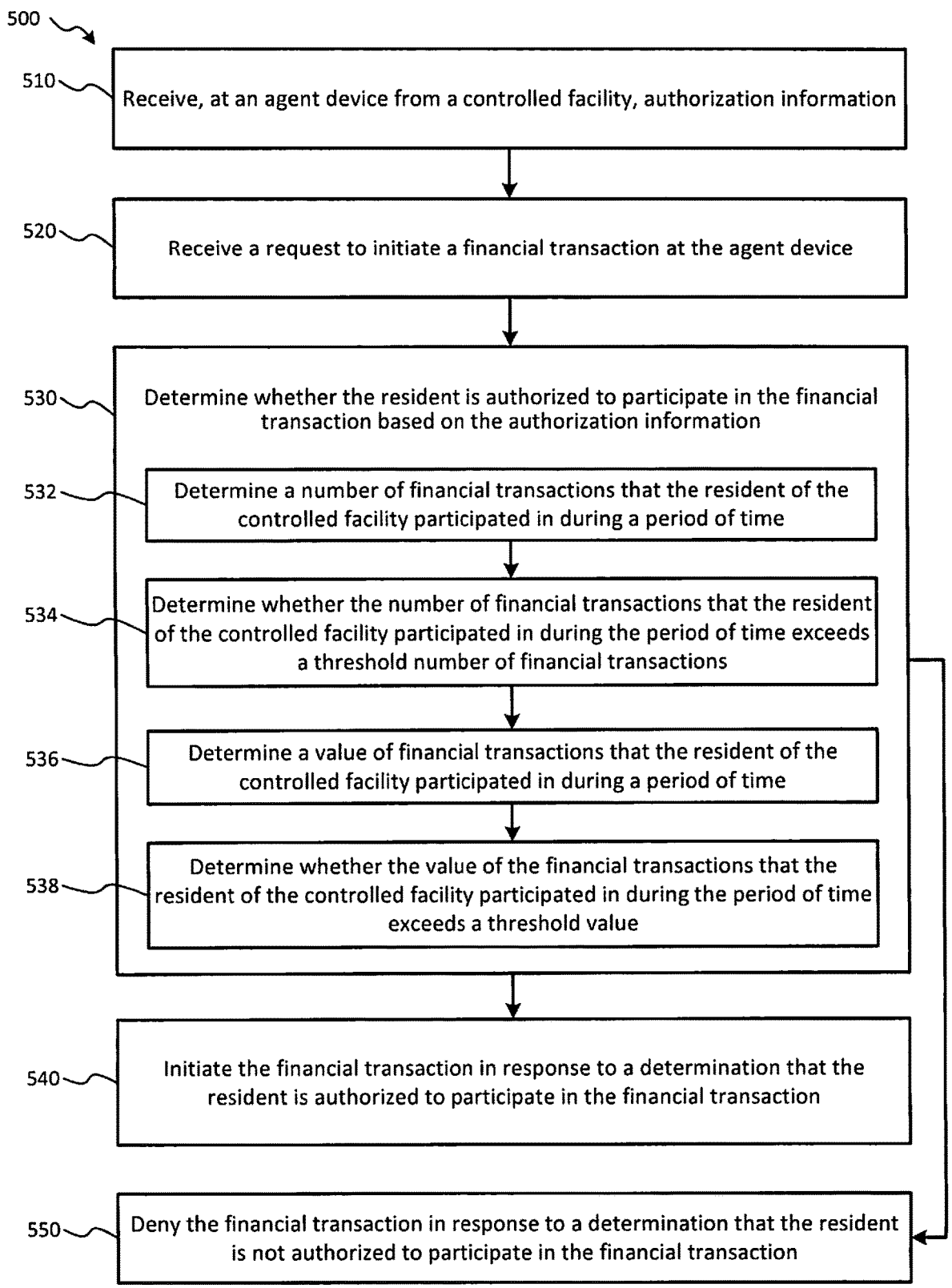
FIG. 5 illustrates a flow chart of a method of providing financial transaction services to residents of a controlled facility.

Referring to FIG. 5, a flow chart of a method of providing financial transaction services to residents of a controlled facility is shown as a method 500. In an aspect, the method 500 may be performed by the agent device 120 FIGS. 1 and 2. At 510, the method 500 includes receiving, at an agent device from a controlled facility, authorization information. The authorization information may identify entities that a resident of the controlled facility is authorized to transfer funds to and entities that the resident of the controlled facility is authorized to receive funds from. In an aspect, the authorization information may be the authorization information 152 of FIG. 1 or the authorization information 132 of FIG. 1. At 520, the method 500 includes receiving a request to initiate a financial transaction at the agent device. At least one party to the financial transaction is a resident of a controlled facility, and the request may be received at the agent device from an electronic device (e.g., the kiosk device 110 of FIG. 1, the electronic device 140 of FIG. 1, or the electronic device 240 of FIG. 2). At least one party to the financial transaction is a resident of the controlled facility. At 530, the method 500 includes determining whether the resident is authorized to participate in the financial transaction based on the authorization information. The authorization information may be stored in a database accessible to the agent device. In an aspect, the database may be the database 130 of FIG. 1 and the authorization information may be the authorization information 132 of FIG. 1. In an aspect, determining whether the resident is authorized to participate in the financial transaction based on the authorization information stored in the database accessible to the agent device may include determining whether the party providing funds to the resident in connection with the financial transaction request, or receiving funds from the resident in connection with the financial transaction request is identified in the authorization information stored in the database.

In an additional or alternative aspect, the method 500 may include, at 532, determining a number of financial transactions that the resident of the controlled facility participated in during a period of time, and, at 534, determining whether the number of financial transactions that the resident of the controlled facility participated in during the period of time exceeds a threshold number of financial transactions. The electronic device may initiate the financial transaction based, at least in part, on whether the number of financial transactions that the resident of the controlled facility participated in during the period of time exceeds the threshold number of financial transactions. For example, as described above with reference to FIG. 1, the electronic device 140 may authorize the financial transaction when the number of financial transactions that the resident 102 participated in during the period of time is less than the threshold number of financial transactions, and may deny the financial transaction when the number of financial transactions that the resident 102 participated in during the period of time exceeds the threshold number of financial transactions.

In an additional or alternative aspect, the method 500 includes, at 536, determining a value of financial transactions that the resident of the controlled facility participated in during a period of time, and, at 538, determining whether the value of the financial transactions that the resident of the controlled facility participated in during the period of time exceeds a threshold value. The financial transaction may be initiated based, at least in part, on whether the value of the financial transactions that the resident of the controlled facility participated in during the period of time exceeds the threshold value. In an aspect, the method 500 may determine whether the resident is authorized to participate in the financial transaction based on both the number of financial transactions, as indicated at 522 and 524 and the value of the financial transactions that the resident has participated in.

At 540, the method 500 includes, initiating the financial transaction in response to a determination that the resident is authorized to participate in the financial transaction. As described above with reference to FIG. 1, initiating the financial transaction by the electronic device 140 may include transmitting the request to an agent device, such as the agent device 120 of FIGS. 1 and 2, where the agent device completes the financial transaction. At 550, the method 500 includes denying the financial transaction in response to a determination that the resident is not authorized to participate in the financial transaction. As explained above with respect to FIG. 1, the financial transaction may be denied when the number of financial transactions that the resident 102 participated in during the period of time exceeds the threshold number of financial transactions, and/or when the value of the financial transactions that the resident of the controlled facility participated in during the period of time exceeds the threshold value. Additionally, the financial transaction may be denied when a party that is to receive funds from the resident or a party that is to provide funds to the resident in connection with the financial transaction is not identified in the authorization information.

Although the embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method for providing regulatory compliant transaction services control with respect to residents of a plurality of controlled facilities, the method comprising:
   receiving, by an electronic device of a money transfer network of a money transfer service provider, authorization information from an electronic device of a first controlled facility of the plurality of controlled facilities, wherein a first portion of the authorization information corresponds to a first resident of a plurality of residents of the first controlled facility and other portions of the authorization information correspond to other residents of the first controlled facility, wherein the first portion of the authorization information corresponding to the first resident identifies one or more first entities that are authorized to send funds to the first resident and identifies one or more second entities that are authorized to receive funds from the first resident;
   receiving, by the electronic device of the money transfer network, a request to initiate a financial transaction between the first resident and a user of a money transfer service provided by the money transfer service provider;
   determining, by the electronic device of the money transfer network, whether the first resident is authorized to participate in the financial transaction with the user based on the first portion of the authorization information corresponding to the first resident, wherein determining whether the first resident is authorized to participate in the financial transaction includes:
      determining, if the financial transaction is a transfer of funds from the first resident to the user, whether the user is authorized to receive funds from the first resident based on the first portion of the authorization information; and
      determining, if the financial transaction is a transfer of funds from the user to the first resident, whether the user is authorized to send funds to the first resident based on the first portion of the authorization information;
   accessing, by the electronic device of the money transfer network, a transaction log to identify transaction information associated with completed financial transactions that the first resident participated in;
   applying, by the electronic device, rules to the transaction information to determine whether the financial transaction complies with regulatory requirements, wherein applying the rules to the transaction information includes:
      determining whether a number of completed financial transactions that the first resident participated in during a first period of time exceeds a threshold number of financial transactions; and
      determining whether a value of the completed financial transactions that the first resident participated in during a second period of time exceeds a threshold value; and
   determining, by the electronic device of the money transfer network, whether to authorize execution of the financial transaction between the first resident and the user based on the determining whether the first resident is authorized to participate in the financial transaction with the user and the applying the rules to the transaction information to determine whether the financial transaction complies with the regulatory requirements; and
   in response to authorizing the financial transaction, initiating, by the electronic device of the money transfer network, the financial transaction between the first resident and the user.

2. The method of claim 1, wherein the first controlled facility is a facility selected from the list consisting of: a prison facility, a nursing home facility, a half-way house facility, and an assisted living facility.

3. The method of claim 1, wherein the electronic device is a kiosk controlled by the money transfer service provider that is located at the first controlled facility, and wherein a second portion of the authorization information corresponding to a second resident of the first controlled facility identifies entities that the second resident is authorized to transfer funds to and identifies entities that the second resident is authorized to receive funds from.

4. The method of claim 1, further comprising:
   sending information associated with the request to an agent device, wherein the agent device is operated by the money transfer service provider, and wherein at least a portion of the financial transaction is performed at an agent location corresponding to the agent device.

5. The method of claim 4, further comprising:
   recording the financial transaction as an entry in the transaction log.

6. The method of claim 1, wherein the transaction log comprises records that include information associated with a transaction value, an identity of a sending party, an identity of a receiving party, and a transaction completion date for each financial transaction completed via the money transfer network.

7. The method of claim 1, further comprising:
initiating transmission of an audit request to an agent device and receiving a report from the agent device in response to transmission of the audit request.

8. The method of claim 7, wherein the audit request identifies a period of time, and wherein the report includes information associated with financial transactions that were completed via the money transfer network during the period of time.

9. The method of claim 7, wherein the financial transactions identified in the report include at least one of: purchases, telephone call logs, bills paid, money transfers to and from an account of the first resident of the controlled facility, pending financial transactions, or a combination thereof.

10. The method of claim 1, further comprising:
receiving, by the electronic device, a second request to initiate a second financial transaction between a second user and the first resident:
determining, by the electronic device, whether the first resident is authorized to participate in the second financial transaction based on the first portion of the authorization information, wherein determining whether the first resident is authorized to participate in the second financial transaction includes:
determining, based on the first portion of the authorization information, whether the second user is authorized to transfer funds to or receive funds from the first resident;
denying the second request in response to a determination that the second user is not authorized to transfer funds to or receive funds from the first resident; and:
providing information indicating a reason for denying the second request to the first resident.

11. A non-transitory computer-readable storage medium storing instructions that, when executed by one or more processors, cause the one or more processors to perform operations for providing regulatory compliant transaction services control with respect to residents of a plurality of controlled facilities, the operations comprising:
receiving authorization information at an electronic device of a money transfer network of a money transfer service provider from an electronic device of a first controlled facility of the plurality of controlled facilities, wherein a first portion of the authorization information corresponds to a first resident of a plurality of residents of the first controlled facility and other portions of the authorization information correspond to other residents of the first controlled facility, wherein the first portion of the authorization information corresponding to the first resident identifies one or more first entities that are authorized to send funds to the first resident and identifies one or more second entities that are authorized to receive funds from the first resident;
receiving a request to initiate a financial transaction between the first resident and a user of a money transfer service provided by the money transfer service provider;
determining whether the first resident is authorized to participate in the financial transaction with the user based on the first portion of the authorization information corresponding to the first resident, wherein determining whether the first resident is authorized to participate in the financial transaction includes:
determining, if the financial transaction is a transfer of funds from the first resident to the user, whether the user is authorized to receive funds from the first resident based on the first portion of the authorization information; and
determining, if the financial transaction is a transfer of funds from the user to the first resident, whether the user is authorized to send funds to the first resident based on the first portion of the authorization information;
accessing a transaction log to identify transaction information associated with completed financial transactions that the first resident participated in;
applying rules to the transaction information to determine whether the financial transaction complies with regulatory requirements, wherein applying the rules to the transaction information includes:
determining whether a number of completed financial transactions that the first resident participated in during a first period of time exceeds a threshold number of financial transactions; and
determining whether a value of the completed financial transactions that the first resident participated in during a second period of time exceeds a threshold value; and
determining whether to authorize execution of the financial transaction between the first resident and the user based on the determining whether the first resident is authorized to participate in the financial transaction with the user and the applying the rules to the transaction information to determine whether the financial transaction complies with the regulatory requirements; and
in response to authorizing the financial transaction, initiating the financial transaction between the first resident and the user.

12. The non-transitory computer-readable storage medium of claim 11, wherein the first controlled facility is a facility selected from the list consisting of: a prison facility, a nursing home facility, a half-way house facility, and an assisted living facility.

13. The non-transitory computer-readable storage medium of claim 11, wherein the electronic device is a kiosk controlled by the money transfer service provider that is located at the first controlled facility, and wherein a second portion of the authorization information corresponding to a second resident of the first controlled facility identifies entities that the second resident is authorized to transfer funds to and identifies entities that the second resident is authorized to receive funds from.

14. The non-transitory computer-readable storage medium of claim 11, the operations further comprising:
sending information associated with the request to an agent device, wherein the agent device is operated by the money transfer service provider, and wherein at least a portion of the financial transaction is performed at an agent location corresponding to the agent device.

15. The non-transitory computer-readable storage medium of claim 14, the operations further comprising:
recording the financial transaction as an entry in the transaction log.

16. The non-transitory computer-readable storage medium of claim 11, wherein the transaction log comprises records that include information associated with a transaction value, an identity of a sending party, an identity of a receiving party, and a transaction completion date for each financial transaction completed via the money transfer network.

17. The non-transitory computer-readable storage medium of claim 11, the operations further comprising:
   initiating transmission of an audit request to an agent device and receiving a report from the agent device in response to transmission of the audit request.

18. The non-transitory computer-readable storage medium of claim 17, wherein the audit request identifies a period of time, and wherein the report includes information associated with financial transactions that were completed via the money transfer network during the period of time.

19. The non-transitory computer-readable storage medium of claim 17, wherein the financial transactions identified in the report include at least one of: purchases, telephone call logs, bills paid, money transfers to and from an account of the first resident of the controlled facility, pending financial transactions, or a combination thereof.

20. The non-transitory computer-readable storage medium of claim 11, further comprising:
   receiving, by the electronic device, a second request to initiate a second financial transaction between a second user and the first resident;
   determining, by the electronic device, whether the first resident is authorized to participate in the second financial transaction based on the first portion of the authorization information, wherein determining whether the first resident is authorized to participate in the second financial transaction includes:
      determining, based on the first portion of the authorization information, whether the second user is authorized to transfer funds to or receive funds from the first resident;
   denying the second request in response to a determination that the second user is not authorized to transfer funds to or receive funds from the first resident; and
   providing information indicating a reason for denying the second request to the first resident.

21. A system for providing regulatory compliant transaction services control with respect to residents of a plurality of controlled facilities, the system comprising:
   an electronic device of a money transfer network of a money transfer service provider a memory storing authorization information and a transaction log; and
   one or more processors communicatively coupled to the memory, the one or more processors configured to:
      receive the authorization information from an electronic device of a first controlled facility of the plurality of controlled facilities, wherein a first portion of the authorization information corresponds to a first resident of a plurality of residents of the first controlled facility and other portions of the authorization information correspond to other residents of the first controlled facility, wherein the first portion of the authorization information corresponding to the first resident identifies one or more first entities that are authorized to send funds to the first resident and identifies one or more second entities that are authorized to receive funds from the first resident;
      receive a request to initiate a financial transaction between the first resident and a user of a money transfer service provided by the money transfer service provider;
      determine whether the first resident is authorized to participate in the financial transaction with the user based on the first portion of the authorization information corresponding to the first resident, wherein determining whether the first resident is authorized to participate in the financial transaction includes:
         determine, if the financial transaction is a transfer of funds from the first resident to the user, whether the user is authorized to receive funds from the first resident based on the first portion of the authorization information; and
         determine, if the financial transaction is a transfer of funds from the user to the first resident, whether the user is authorized to send funds to the first resident based on the first portion of the authorization information;
      access the transaction log to identify transaction information associated with completed financial transactions that the first resident participated in;
      apply rules to the transaction information to determine whether the financial transaction complies with regulatory requirements, wherein applying the rules to the transaction information includes:
         determine whether a number of completed financial transactions that the first resident participated in during a first period of time exceeds a threshold number of financial transactions; and
         determine whether a value of the completed financial transactions that the first resident participated in during a second period of time exceeds a threshold value; and
      determine whether to authorize execution of the financial transaction between the first resident and the user based on the determining whether the first resident is authorized to participate in the financial transaction with the user and the applying the rules to the transaction information to determine whether the financial transaction complies with the regulatory requirements; and
      initiate the financial transaction between the first resident and the user in response to authorizing the financial transaction.

* * * * *